INVENTORS
G. HORTON, W. A. RUTH & C. COX

INVENTORS
G. HORTON, W.A. RUTH & C. COX

BY
ATTORNEYS

INVENTORS
G. HORTON, W.A. RUTH &
C. COX

ATTORNEYS

INVENTORS
G. HORTON, W. A. RUTH & C. COX

INVENTORS
G. HORTON, W. A. RUTH & C. COX

INVENTORS
G. HORTON, W. A. RUTH & C. COX

United States Patent Office 3,433,107
Patented Mar. 18, 1969

3,433,107
ROUNDED CORNER CARD CUTTER
Gilbert Horton, High Point, Wayne A. Ruth, Jamestown, and Clarence Cox, High Point, N.C., assignor, by mesne assignments, to Control Data Corporation, Rockville, Md., a corporation of Delaware
Filed Oct. 20, 1965, Ser. No. 498,294
U.S. Cl. 83—117    14 Claims
Int. Cl. B26d 7/06, 1/56; B23d 25/02

ABSTRACT OF THE DISCLOSURE

A device for cutting round corners on business machine cards includes a pair of blades 46 and 71 mounted on parallel rollers 30 and 31 on opposite sides of a moving web W of card stock, the cutting edge of the blades being helically arranged on the surface of the rollers, one blade 46 being fixed and the other being mounted for limited rotation about its roller axis to permit the blades to cut transversely across the web with a scissors-like action, the blades having mating convex and concave cutting edges at each end (FIGS. 5 and 6), whereby the card after cutting will have rounded corners 22 at one end and points 26 at its other end (FIG. 30) and additional reciprocating corner cutting devices 27 (FIGS. 15 to 18) for cutting the points 26 from the card to form concave corners 16 or angular corners 17 (FIGS. 31 and 32).

---

Figure 1:
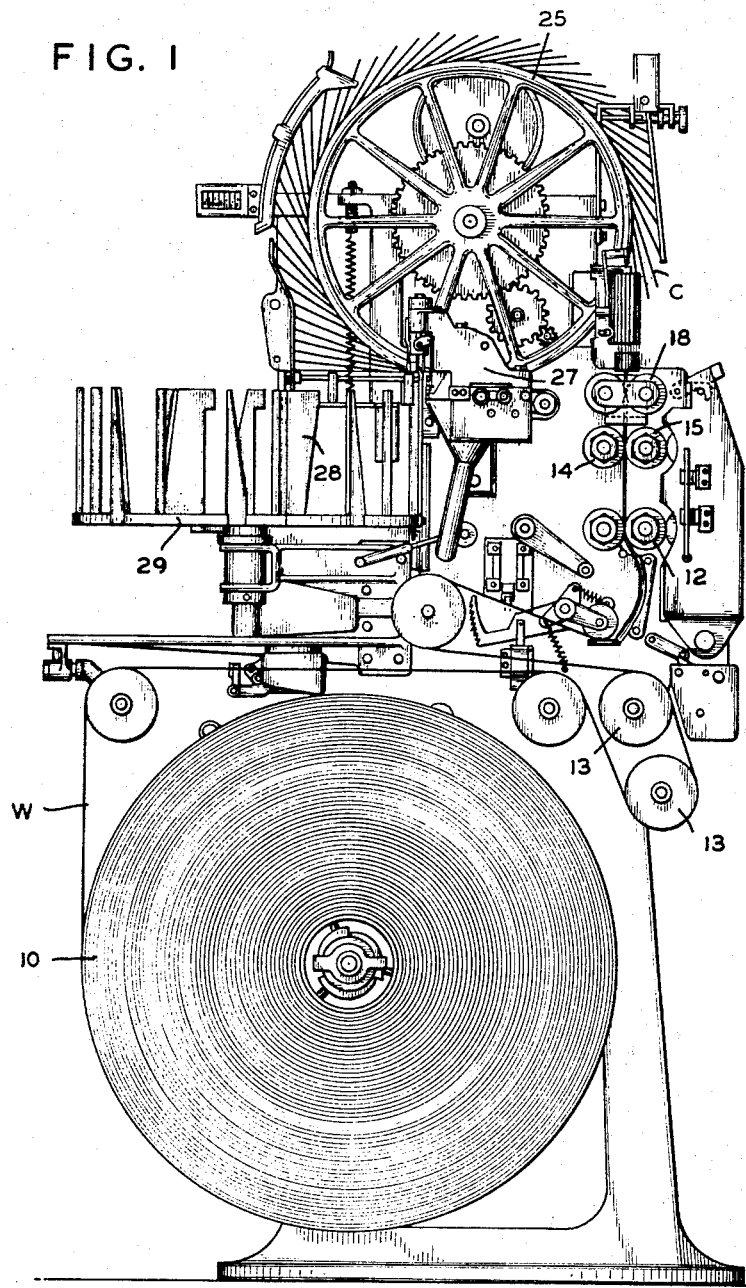

This invention relates to the art of cutting generally and to the manner by which a continuously moving web of material can be cut into individual portions having rounded corners.

The invention particularly relates to the manufacture of rounded corner business machine cards of the type in which information is stored or instructions are given to business machines by punching or opening holes at specified locations on the cards which hole positions are designated by printed numbers.

For many years business machine cards of this type have been made with three 90° angle corners and one 60° angle corner. Neither the 90° angle corners nor the 60° angle corner has any significance so far as the mechanical operation of the cards within the machine is concerned. The purpose of the 60° angle corner is to facilitate the alignment of the cards in identical position, since a 90° corner of a misaligned card will project beyond the 60° corner. The position of the 60° angle corner is specified by the customer to facilitate the identification of different type cards. Pay roll cards, for example, may have the 60° corner on the upper righthand corner, and inventory cards may have the 60° angle cut on the upper left-hand corner.

It has been found in practice that many of the 90° angle corners of cards have become dog-eared, bent, or split in use. This has caused the cards to jam in the machine or to slow down the operation of the machine and necessitated the preparation of new cards. Such replacement involves the cost of the cards and, more significantly, the labor of punching and the possibility of error. In addition, stacks of square cornered cards are difficult to load into the machine, since the corners may frictionally bind.

Cards with rounded corners recently have appeared on the market to overcome this problem. Difficulties have been experienced in manufacturing such cards, since additional equipment has been supplied for cutting such rounded corners, it being inherently difficult to make a curved cut with mcehanical equipment. There have been high wastage factors in cutting with machines known to applicant.

Both square cornered cards and round cornered cards are generally produced by a machine similar to that disclosed in Carroll Patent No. 2,181,935. In the operation of this machine the web from continuous rolls move through pairs of printing rollers which print numbers designating the hole punch position and other identifying data desired by the customer.

As the forward end of what will be a single card leaves the printing rollers, and while the rearward end of the future card is still being printed, the web moves between a pair of rollers on which cutting blades are mounted. These cutting blades sever the web transversely to form individual cards having 90° angle corners. Because the cutting takes place during the printing operation the printed hole position numerals are very precisely located relative to the cut end. The cards are then gripped by clips on a conveyor drum which holds each card spaced from other cards while the ink is drying and delivers the cards to mechanism which cuts the 60° angle corner. A pair of 60° angle corner cutting mechanisms are provided selectively operable to cut the corner on the desired side.

In the manufacture of rounded corner cards an additional mechanism has previously been placed at some point on the machine to cut a round corner. Difficulty has been experienced, in that the end of the curve of rounded corners so cut may not be precisely aligned with the side of the card, leaving an additional projection of material which interferes with the use of the card. In addition, round corners sometimes are cut at a location where a 60° angle cut must later be located. In addition to the expense of providing such duplicate blades which may become dull and frequently must be replaced, there is the possibility that the round corner may interfere with the operation of the 60° angle cutter.

A common problem with the various mechanisms proposed is jamming and other interference with the operation of the machine and the necessity of running the machine at speeds significantly lower than the normal 1350 cards per minute. Reducing the speed of operation of the machine increases the cost of manufacture of the cards significantly since a larger number of machines and operators must be provided to produce a given quantity of cards.

A major object of this invention is the production of cards having round corners, with a minimum of labor, expense, and interference with the operation of other elements of the card producing machine.

Another object of the invention is the production of cards having round corners, in which the cards are produced without the necessity of providing additional cutting elements to the machine but with the round corners produced by simple modification of the existing cutting elements.

Figure 2:
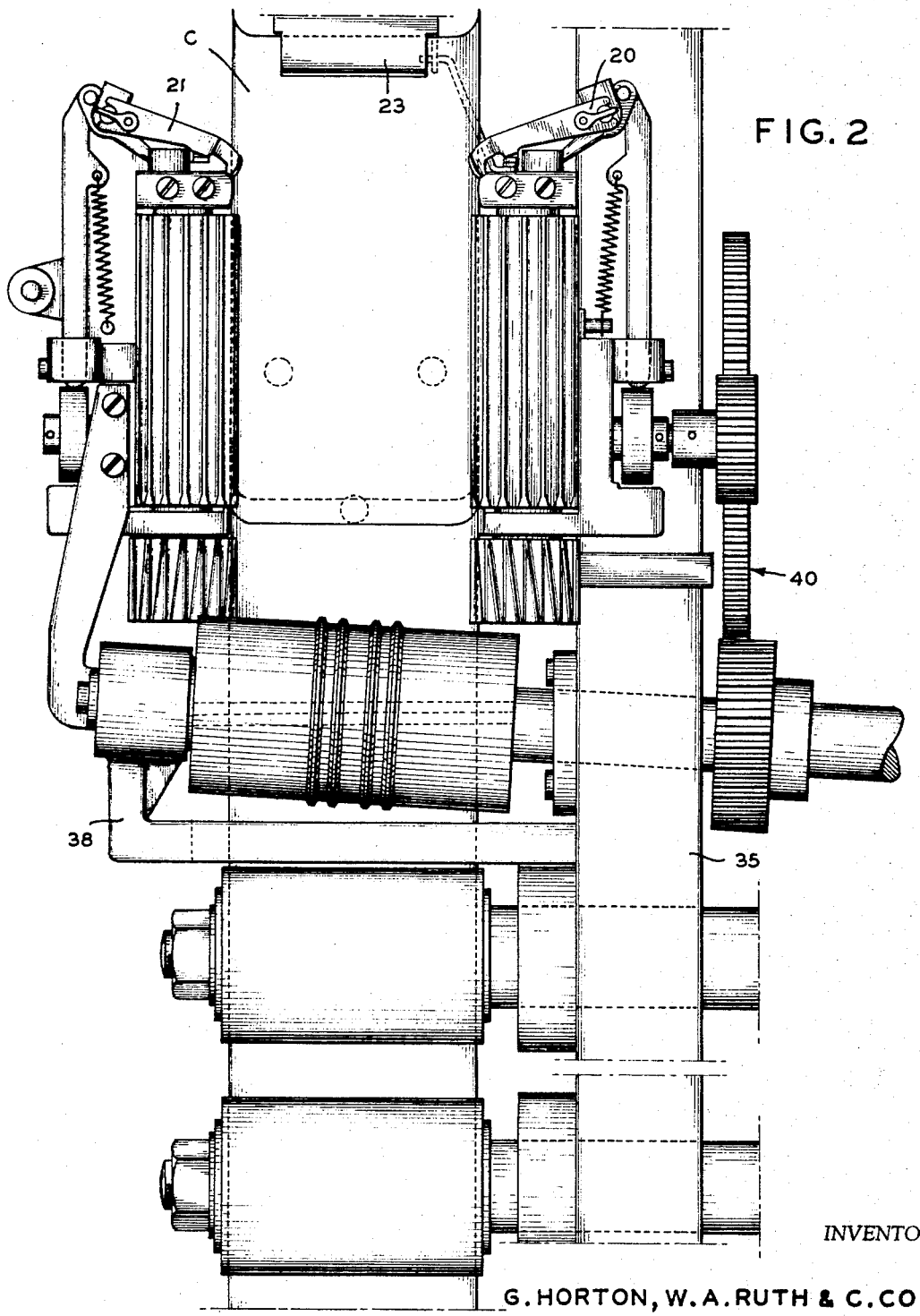
Figure 3:
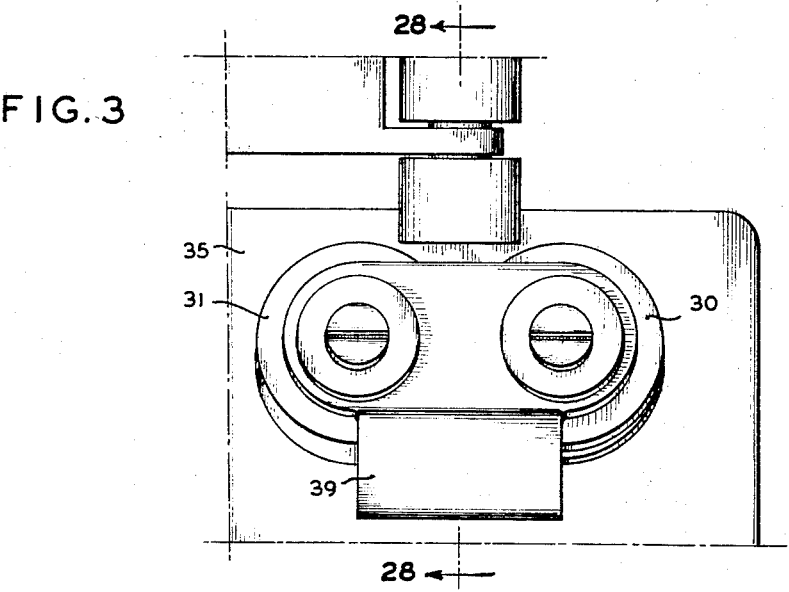
Figure 4:
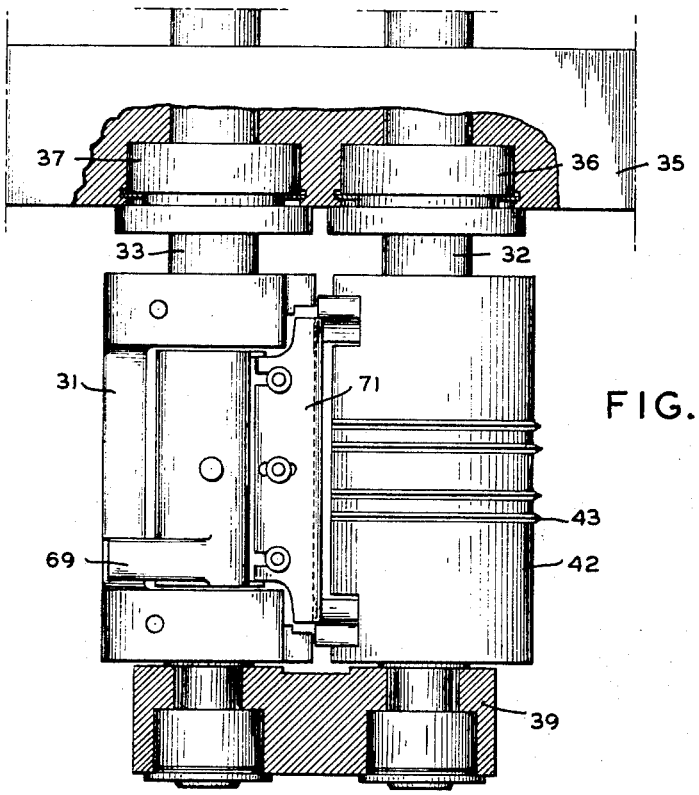
Figure 5:
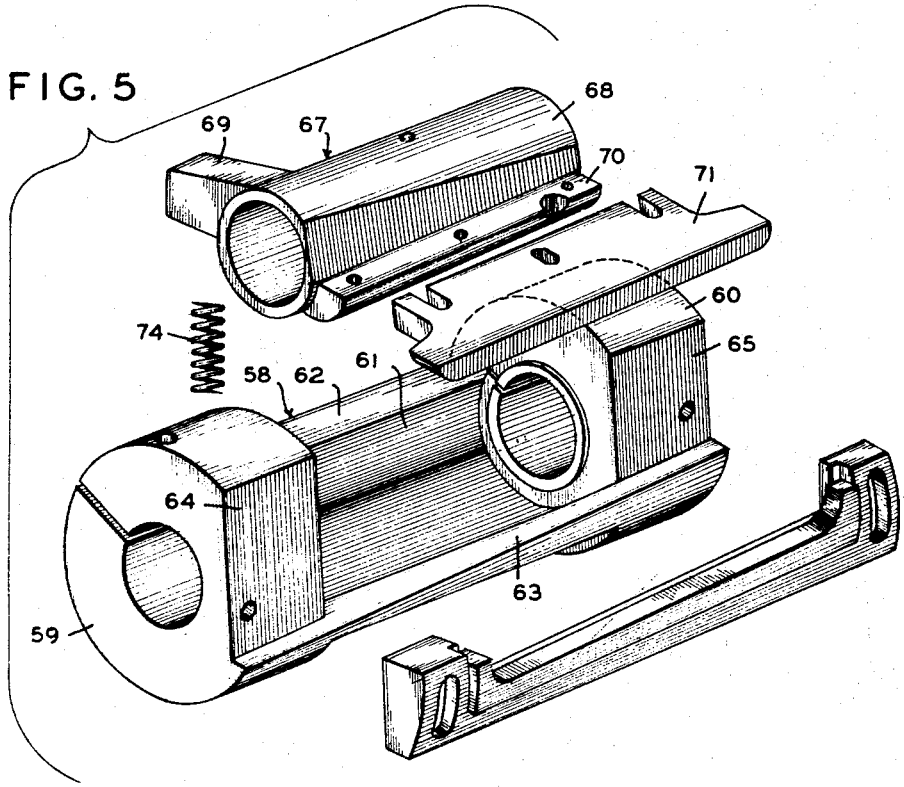
Figure 6:
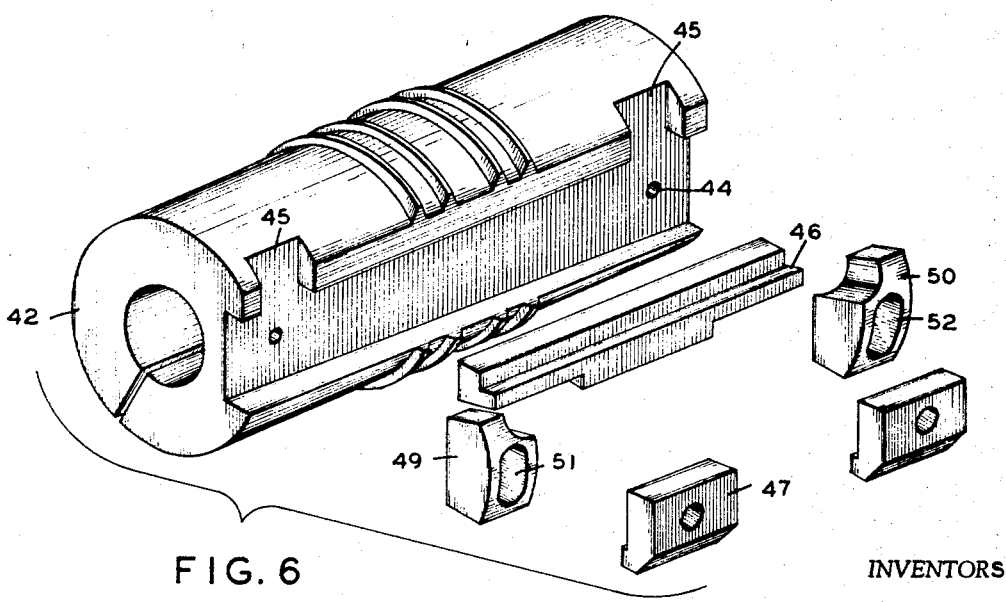
Figure 7:
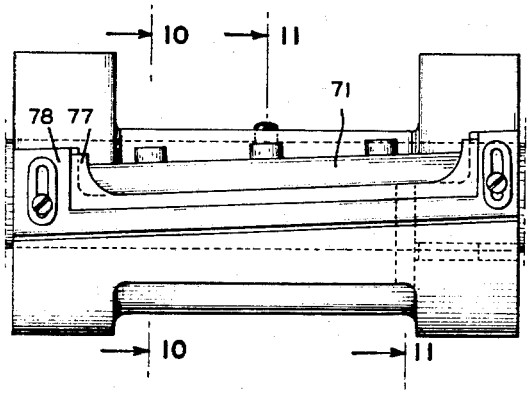
Figure 8:
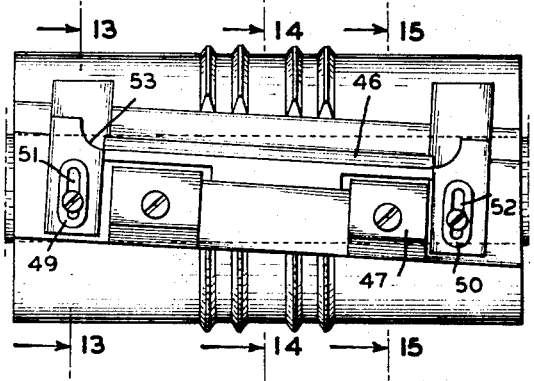
Figure 9:
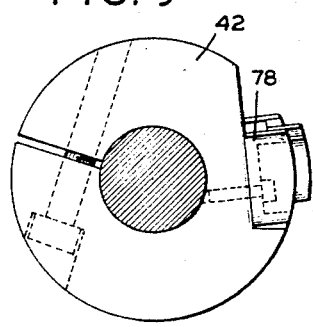
Figure 10:
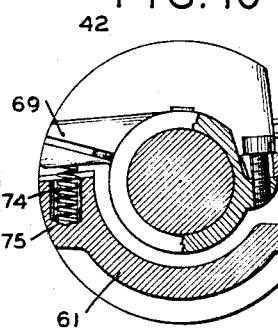
Figure 11:
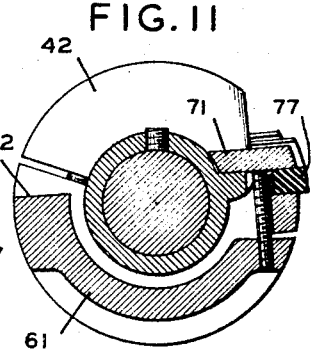
Figure 12:
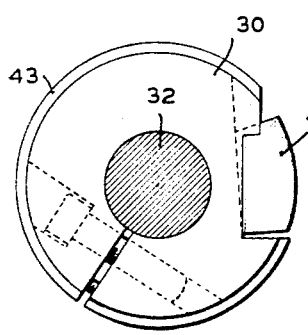
Figure 13:
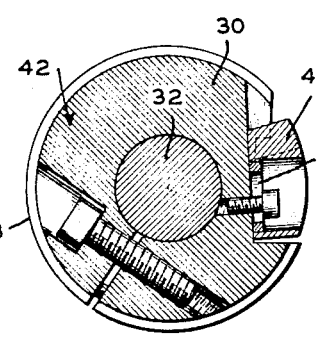
Figure 14:
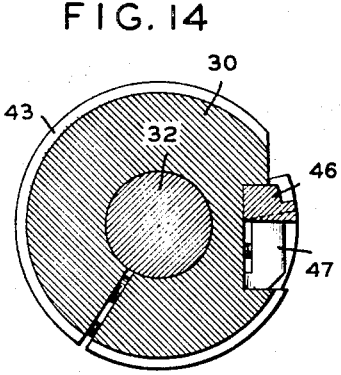
Figure 15:
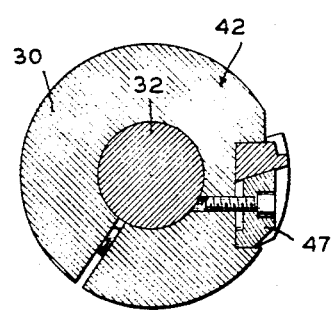
Figure 16:
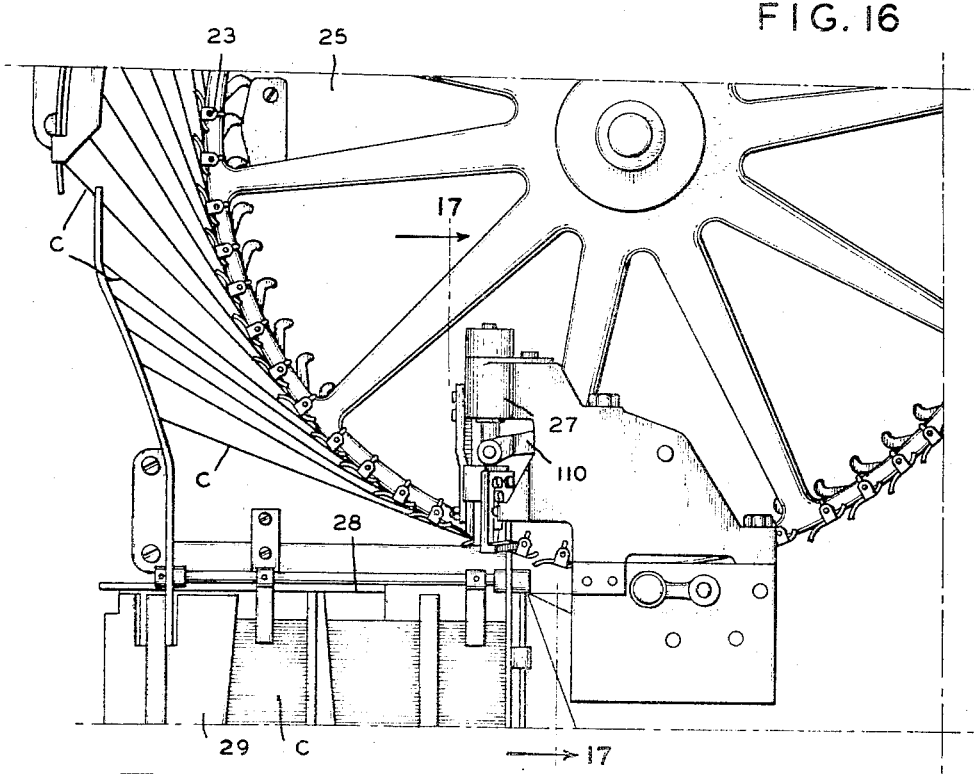
Figure 19:
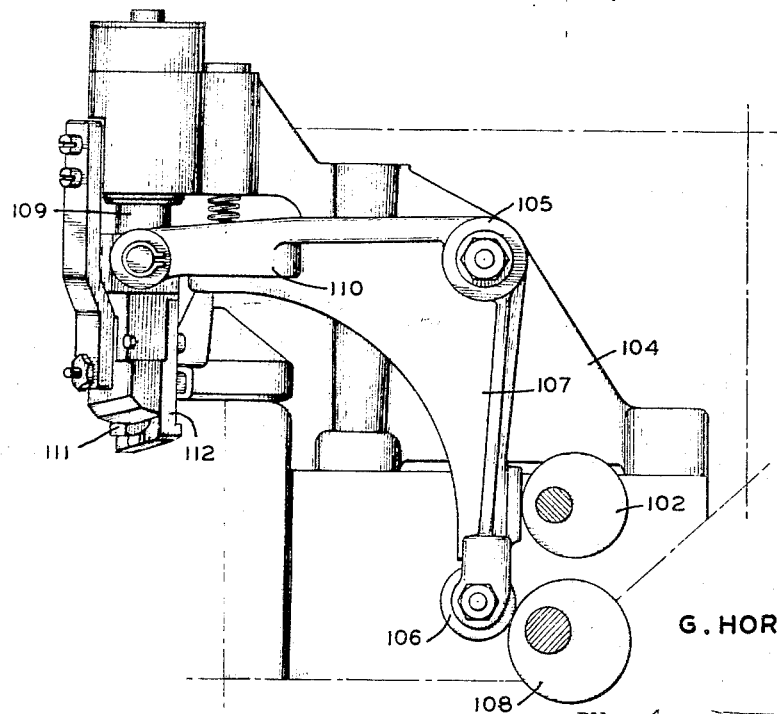
Figure 17:
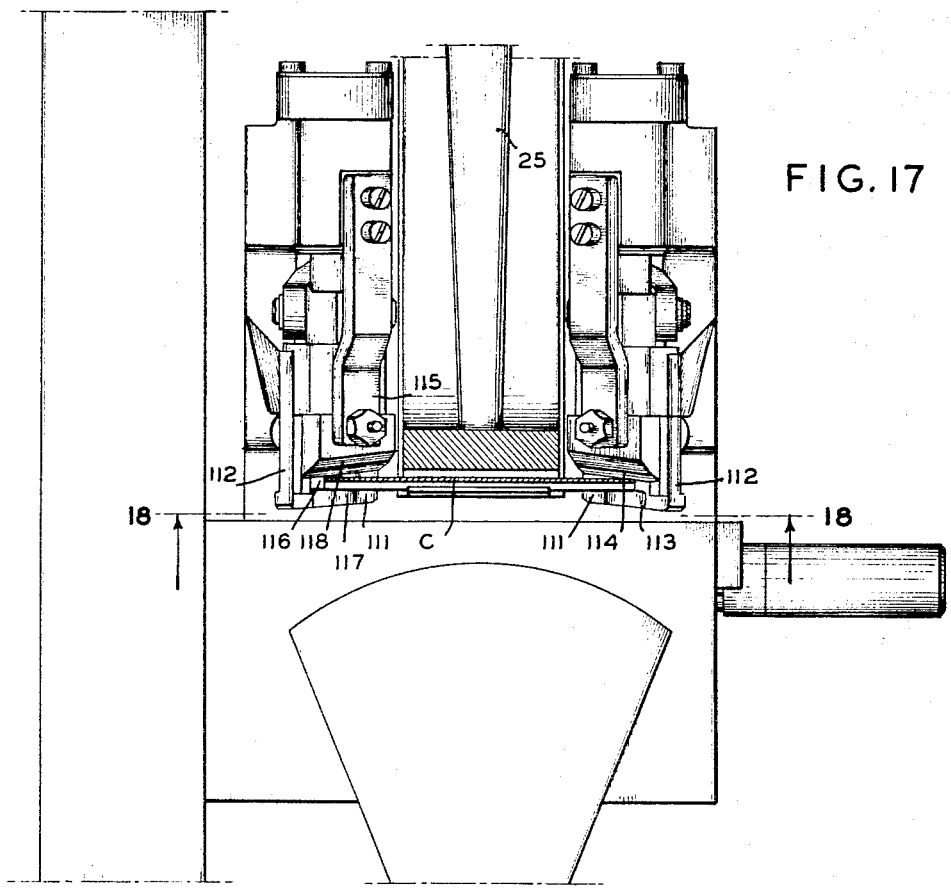
Figure 18:
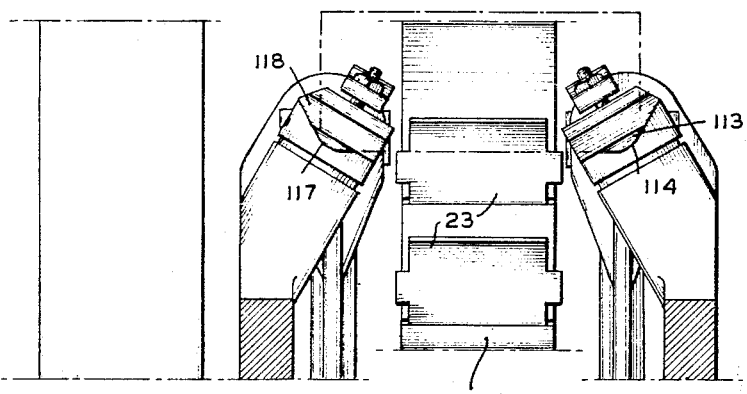
Figure 20:
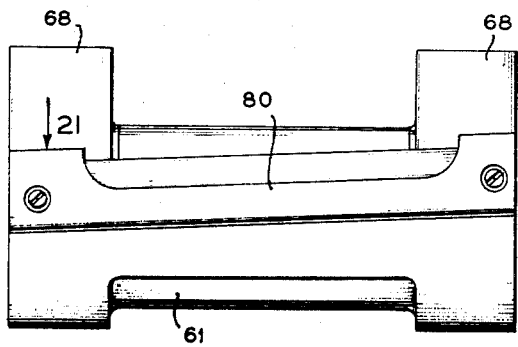
Figure 21:
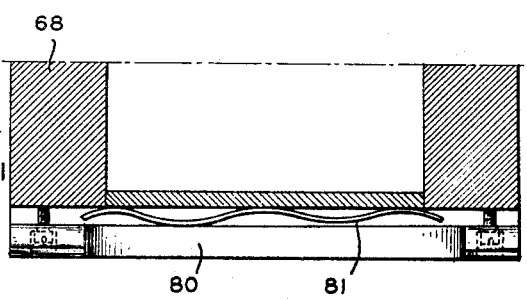
Figure 22:
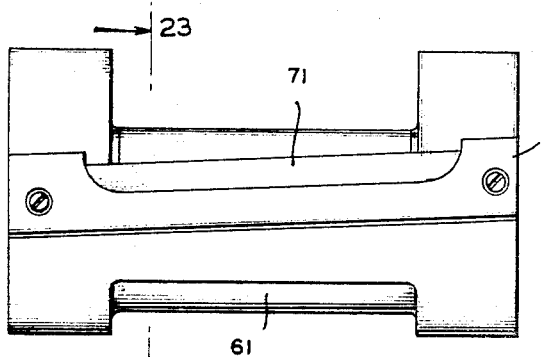
Figure 23:
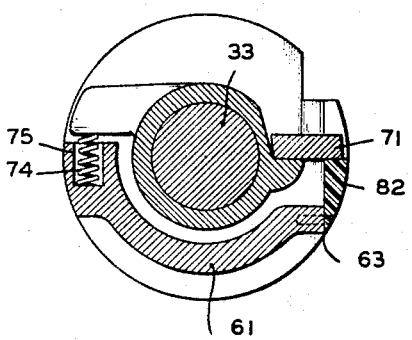
Figure 24:
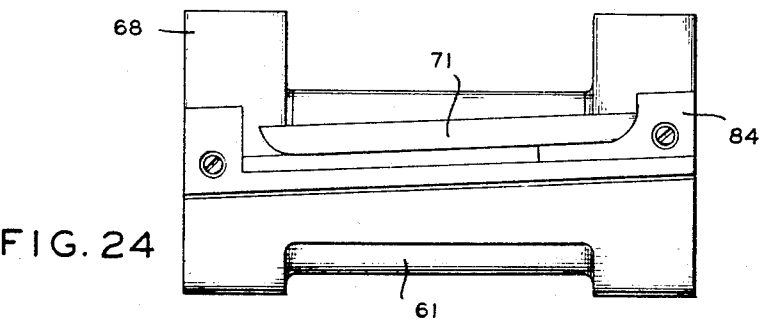
Figure 25:
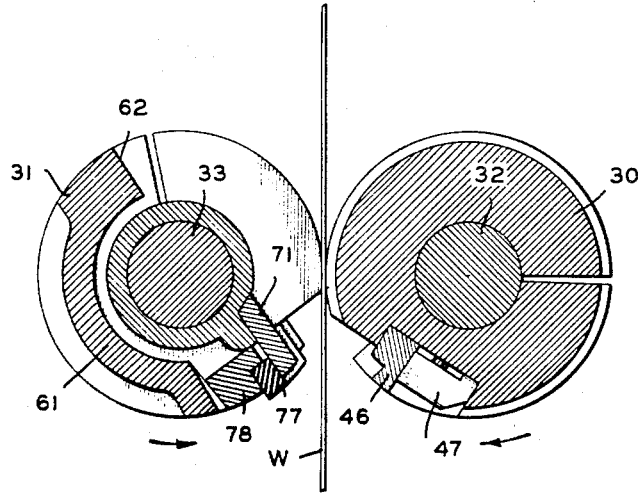
Figure 26:
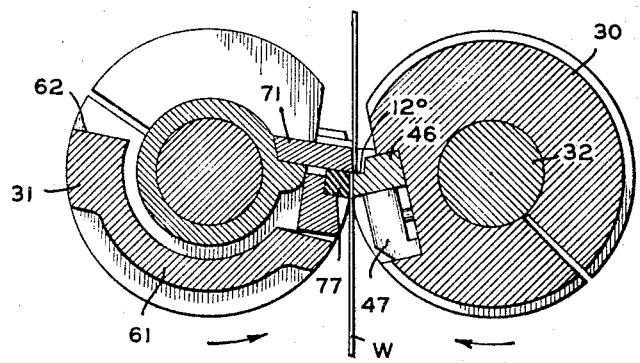
Figure 27:
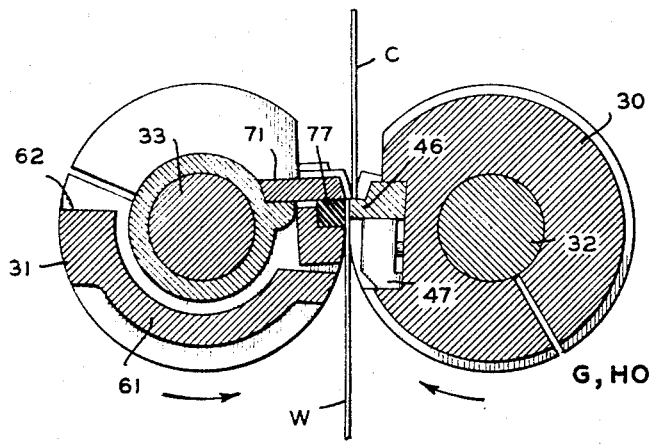
Figure 28:
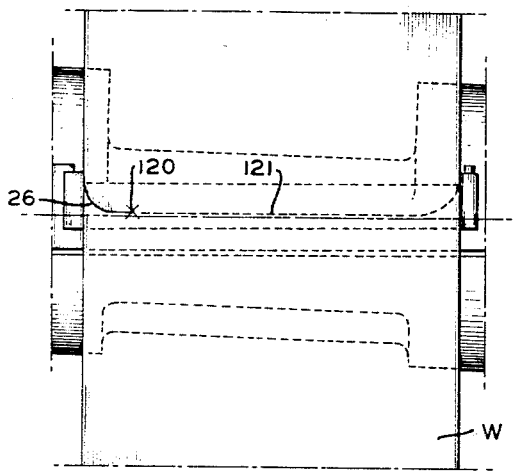
Figure 29:
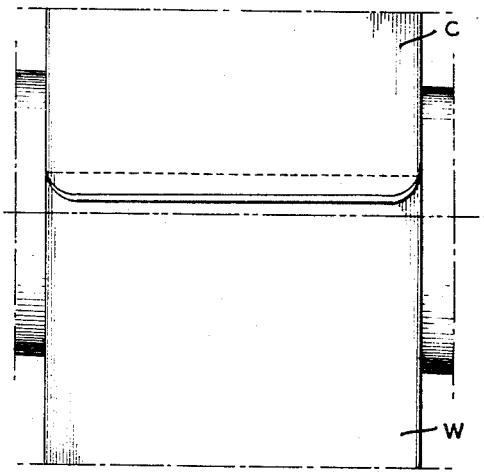
Figure 30:
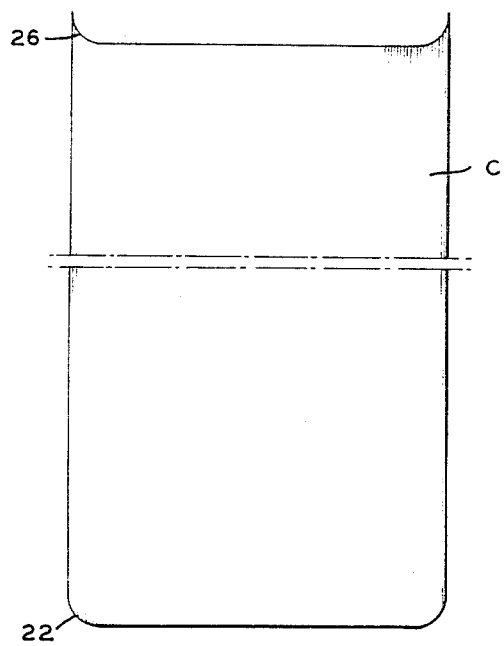
Figure 31:
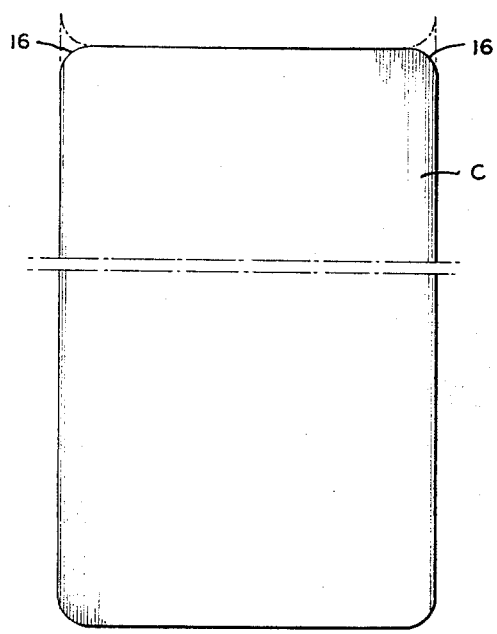
Figure 32:
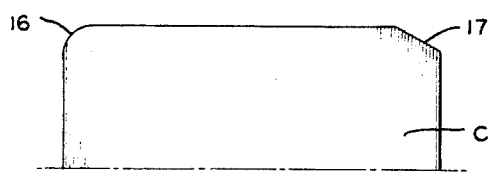

Other objects and advantages of the invention will be apparent from the following description taken in conjunction with the accomapnying drawings, in which:

FIG. 1 is a side elevation of a card printing machine;

FIG. 2, a front elevation with parts removed or broken away to show normally concealed parts;

FIG. 3, a fragmentary front elevation revealing the ends of the shear blade assembly;

FIG. 4, a fragmentary top plan view partially in section of the shear blade assembly;

FIG. 5, an exploded perspective view of the movable or fly blade roller of the shear blade assembly;

FIG. 6, an exploded perspective view of the fixed blade roller of the shear blade assembly;

FIG. 7, a side elevation of the fly blade roller;

FIG. 8, a side elevation of the fixed blade roller;

FIG. 9, an end elevation of the fixed blade roller;

FIG. 10, a sectional view on the line 10—10 of FIG. 7;

FIG. 11, a sectional view on the line 11—11 of FIG. 7;
FIG. 12, an end view of the fixed blade roller;
FIG. 13, a sectional view on the line 13—13 of FIG. 8;
FIG. 14 a sectional view on the line 14—14 of FIG. 8;
FIG. 15, a sectional view on the line 15—15 of FIG. 8;
FIG. 16, an enlarged side elevation of a portion of FIG. 1;
FIG. 17, a sectional view on the line 17—17 of FIG. 16;
FIG. 18, a sectional view on the line 18—18 of FIG. 17;
FIG. 19, an enlarged view of a corner cutting mechanism with portions broken away to reveal concealed parts;
FIG. 20, a plan view of a fly blade roller according to a different modification of the present invention;
FIG. 21, a sectional view taken on the line 21—21 of FIG. 20;
FIG. 22, a side view of a fly blade roller according to a further embodiment of the invention;
FIG. 23, a sectional view on the line 23—23 of FIG. 22;
FIG. 24, a side view of the movable blade roller according to still another embodiment of the invention;
FIG. 25, a sectional view through the shear assembly illustrating the rollers approaching the web cutting position;
FIG. 26, a sectional view similar to FIG. 25 as rollers begin the web cutting operation;
FIG. 27, a sectional view similar to FIG. 25 of the rollers at the completion of the web cutting operations;
FIG. 28, a fragmentary sectional view on the line 28—28 of FIG. 3 illustrating the position of the movable blade cutting member near the beginning of cutting action;
FIG. 29, a fragmentary sectional view similar to FIG. 28, illustrating the fly blade cutting member at a time just after the completion of cutting action;
FIG. 30, a fragmentary plan view of a card, which has been cut by the shear assembly but not by the corner cutting mechanism;
FIG. 31, a fragmentary plan view of a card in which the corner cutting mechanism has cut two rounded corners, the removed forwardly extending projections or ears being shown in dotted lines; and
FIG. 32, a fragmentary view of a card in which the corner cutting mechanism has cut one rounded corner and one 60° angle corner.

Briefly stated, in achieving these and other objects the shearing blades which in the prior art made a transverse cut of a moving web to form individual cards are modified by placing concavely rounded corners at the end of one blade and convexly rounded corners at the ends of the coacting cutting blades; a stripper mechanism being movably mounted behind at least one round corner of a blade to push the corner of a separate card to a position at which it will not catch between the mating concave and convex curved ends of the blade; and the mechanism on one side of the machine which in the prior art cut 60° angle corners being modified to cut a curved corner at the same time that the mechanism on the other side of the machine is cutting a 60° angle corner.

GENERAL DESCRIPTION

With further reference to the drawings, the round corner cutting mechanism of the present invention is mounted on a card printing machine generally similar to that disclosed in Carroll patent, 2,181,935, issued Dec. 5, 1939. The above patent may be referred to for an explanation of details of the machine not pertinent to the present invention.

A supply roll 10 delivers a web W of cardboard stock of the width desired for the business machine cards. The web is driven by feed rollers 12 after passing over various guide rollers 12, and then passes through printing rollers 14, 15 which print any desired indicia or impression including position numerals for information indicating holes. While the lower portion of what will later be an individual card is still being pritned, web W is severed into individual cards C by a shear blade assembly 18 including fixed roller 30 and movable or fly blade roller 31. The individual cards C are grasped by gripper arms 20, 21 which snap the card completely away from the shear assembly and feed it into the bite of a clip 23 on a conveyor wheel 25. The conveyor wheel holds the cards while the ink is drying and carries them into a corner cutting mechanism 27 where the corner cutting operation is completed. Severed cards drop into a magazine 28 of a rotary stacking unit 29. When a particular magazine 28 is filled, the stacking compartment rotates to position another magazine 28 in card receiving position. The operator thereafter removes a stack of completed cards from a full stacking compartment.

The present invention utilizes an improved shear blade assembly 18. The shear blade assembly of the machine disclosed in the Carroll patent makes a straight transverse cut across the web to produce individual cards having 90° corners and the corner cutting mechanism cuts 60° angle corners only. Applicant's improved shear assembly cuts the web into cards which as illustrated in FIGS. 28 and 30 have round corners 22 on one end and forwardly extending concave projections or ears 26 at each corner at the other end. Corner cutting mechanism 27 cuts the ears 26 off so as to leave a convex round corner 16 on one side of the card and a straight 60° angle cut 17 on the other side of the card.

Shear blade assembly

A shear blade assembly includes a fixed blade cutting roller 30 and a movable blade or fly blade roller 31, each mounted on shear shafts 32, 33, journaled in a main frame 35 in bearings 36, 37 at one end. Torrington bearings with needle insert NTA–1625 and associated thrust plate TRA–1625 have been found satisfactory in avoiding undesirable end play which might make impossible smooth cutting on a curve. The opposite end of shear shafts 32, 33 are journaled in a bracket 39 carried by the main frame. The shear shafts project upwardly 3° from the horizontal and perpendicular to the main frame 35. These shafts are driven by gearing 40.

Fixed blade roller 30 includes a generally cylindrically fixed blade holder 42 having raised circumferential ribs 43. An axially extending recess 44 is cut into one cylindrical surface of the cylindrical holder portion. Transverse recesses 45 join axial recess 44. A stationary blade 46 is held in recess 44 by clips 47. Concave blade inserts 49, 50 having longitudinal slots 51, 52 are mounted in recesses 44 at the end of stationary blade 46 to form therewith a continuous cutting edge 53, best seen in FIG. 8.

Fly blade roller 31 includes a housing 58, formed of a pair of end collars 59, 60 joined by a bridge 61 having a rear flat surface 62 and a front flat surface 63. Flat surfaces 64 and 65 are cut into collars 59, 60 up to the plane of bridge front flat surface 63.

A bronze fly blade holder 67 includes a sleeve portion 68, a tail portion 69, and a front projection 70. Fly blade 71 is secured to front projection 70, and the fly blade holder and housing are mounted on shear shaft 33. Spring 74 is mounted in a recess 75 in the rear surface 62 of bridge 61 and acts against the tail 69 to bias blade 71 against an elastomeric die stripper 77, which extends above the blade surface in its unstressed condition. Neoprene artificial rubber of a durometer hardness of 60–70 has been found quite satisfactory as a die stripper. While it has been found only necessary that the die stripper be mounted around the righthand corner (as in FIG. 7) of a blade 71, it is more convenient to manufacture it so that it extends entirely about the cutting edge of blade 71. 3M brand glue EC 226 has been found quite satisfactory for securing the die stripper 77 to a die stripper bracket 78.

The blades' cutting edges are helical with respect to the shear shaft axes, the angle being 2° 50′ in the case of stationary blade 46 and 3° 5′ 30″ with respect to blade 71. The shear shafts are mounted at an angle of 3° to the rodizontal opposite in direction to the helical angle; consequently, the stationary and the fly blades assume approximately a horizontal position. However, mounting the shafts at an angle causes the blades to first come in contact at the upper or left-hand side (as seen in FIG. 2), as the blade rollers rotate. The point of engagement of the blades moves along to the lower or right-hand side of the rollers in an action somewhat similar to scissors blade engagement. The point of contact is always horizontal. Spring 70, and the slight variance in the angle of the stationary and of the fly blades relative to the shear axes, permits the necessary yielding action between blades.

The aforementioned Carroll patent has similar fixed and moving blade rollers laid out with shear shafts having similar angles, with the blades having similar helical angles relative to the shear shaft. However, the Carroll blades are straight. Applicant's invention resides in the provision of curved blades in place of the straight blades of Carroll. The provision of such curved blades proved difficult since cutting a web with curved blades involved solution of many problems particularly at the 1,000 to 1,350 cards per minute speeds used. Great difficulty was experienced in aligning the curve of the round corners with the side of individual cards, and in prevention of tearing and jamming. Provision of some biasing means such as die stripper 77 was necessary to overcome this difficulty.

One possible explanation for the utility of die stripper 77 may be that spring 74 would cause fly blade 71 to catch a corner of a card C in the absence of the stripper. Another explanation may be that the die stripper minimizes any tendency of the cutting blades to force Web W toward the main frame 35 during the cutting action. Another might be that the stripper breaks any remaining adhesion between the card C and the web W.

Achievement of cooperation of the curved portions of the fly blade and the fixed blade cutting edges involved difficulty. Two convex blade portions must fit within two fixed concave blade portions on blades moving very rapidly at difficult angles. The provision of applicant's concave blade inserts at each end of said stationary blade simplified by the manufacturing problems and permitted blade adjustments necessary for cooperative cutting action.

*Modified die strippers*

FIGS. 20 and 21 illustrate a fly blade roller in which a plastic die stripper 80 or presser is secured to collars 68 by a leaf spring 81.

FIGS. 22 and 23 illustrate a flat spring plate die stripper 82 having one edge overlapping and secured to the bridge 61 of the fly blade housing. This die stripper may be made of a metal covered with a plastic or of a resilient plastic material and flexes to bias the cut card away from the blade.

FIG. 24 illustrates a die stripper 84 of an elastomer material similar to that of die stripper 77. It extends only about the concave cutting edge of blade 71 located on the side closest main frame 35. A die stripper made of spring steel covered with a plastic as in FIGS. 22–23 or a free-floating bar spring as in FIGS. 20–21 might have similar limited extent.

*Corner cuter*

Referring to FIGS. 16 and 19, conveyor wheel 25 carries corner cutting mechanism 27. As best shown in FIGS. 17 and 18, one corner cutting mechanism is located at each side of the path followed by a moving card. The corner cutting operating mechanism as illustrated in FIG. 19 is furnished by the manufacturers of the Carroll machine, and by itself forms no part of applicant's invention. The prior art has used this mechanism to cut straight 60° angle corners on cards to facilitate identification. Corner cutting mechanisms are located at each side of the card path so that the corners can be cut on a desired side while the corner cutter on the other side is held in an inoperative position by a locking cam 102. The mechanism includes a bracket 104 secured to the main frame on which is pivoted a rocket arm 105, having a roller 106 at the end of a vertical portion 107. An operating cam 108 continuously rotates during operation of the machine and engages roller 106 to continuously raise and lower a slide 109 pivoted to a horizontal portion 110 of rocker arm 105 (unless locking cam 102 holds roller 106 out of engagement with the operating cam 108). The lower end of the slide carries arms 111, 112 which are connected by a straight cutting blade 113 in the prior art corner cutter. Bracket 104 has secured to it a mating fixed straight edge blade 114 through support arm 115. A space 116 exists between fixed blade 115 and moving blade 113 into which the projecting card ears are moved by the conveyor wheel 25, while movable blade 113 is at its lowest point of travel. Continuing movement of conveyor wheel 25 disengages grip 23 from the cards as they strike the slide arms 111. The upward movement of blade 113 cuts the projections off the cards. Applicant's improvement resides in the substitution of concave blade 117 for moving straight blade 113 and convex fixed blade 118 for fixed blade 113.

In normal operation the corner cutter on one side will have straight blades and the one on the other will have curved blades as is illustrated in FIG. 18. Since different customers desire different corners cut for particular orders, straight or curved blades can be used on a given side as desired. Applicant has found it more convenient in practice to substitute the complete corner cutting mechanisms by removing them with brackets 104. This avoids precise readjustment of the relative positions of the fixed and the moving blades. Cards may be cut also with all four corners having convex curves; with the 60° angle corners later being cut as desired. This is particularly useful to build up an inventory for filling small orders.

*Operation*

Web W moves between the printing rollers 14 and 15 and then between the shearing rollers 30 and 31. Since the shear shafts 32 and 33 are set at an angle of approximately 3°, fly blade 71 and fixed blade 46 first meet near point 120 as seen in FIGS. 26 and 28. Since movable blade 71 is set at an angle relative to the shaft of 3° 5′ and the fixed blade 46 is set at an angle of 2° 50′, both angles being in a reverse direction to the angle of shear shafts 32 and 33, the line of meeting 121 is horizontal but moves upwardly with the web. Because of the movable blade and the fixed blade having different helical angles, the blade meeting point moves from right to left as seen in FIG. 28 and the blades wipe across each other somewhat like a pair of scissors. This movement is possible only because fixed blade 46 can push movable blade 71 backwards again the force of the spring 74.

As has been mentioned before, it has been found only necessary that die stripper 77 act at the side nearest main frame 35.

The leading edge of the newly severed card C has at each side two forwardly pointing projections or ears 26 representing the concave remainder following the convex cut. Immediately on completion of the cut card grippers 20, 21 snap the card away from the web so that it separates therefrom as shown in FIG. 29. The grippers push the card into clip 23 which carries it around and into the mouth of the corner cutter mechanism 27.

In the prior art the corner cutter on only one side was normally operative. Turning locking cam 102 to move rocker arm 105 and roller 106 out of the path of operating cam 108 deactivates a corner cutting mechanism. As illustrated in FIG. 18, a right-hand corner cutting unit has straight edged blades 113, 114 for making a straight 60° angle cut and a left-hand unit has curved blades 117, 118 for making a round corner cut. Neither normally would be deactivated unless it was desired to make 90° corner cards by restoring the original machine equipment.

As the cards are cut by the fixed and movable jaws, they fall into the magazine 28 of rotary stacking unit 29.

It will be apparent that apparatus has been provided which efficiently severs a continuously moving web into round corner cards by modification of the existing cutting equipment of the known prior art machine. No additional cutting equipment need be placed on the machine.

It will be obvious to one skilled in the art that various changes may be made in the invention without departing from the spirit and scope thereof and therefore the invention is not limited by that which is illustrated in the drawings and described in the specification but only as indicated in the accompanying claims.

What is claimed is:

1. A device for severing a continuously moving web of paper into elongated portions having rounded corners, comprising a base carrying:
   (a) means for continuously moving a web of material,
   (b) a first support member mounted on one side of said web for rotary movement about an axis generally parallel to the plane of the moving web and at a small angle to a plane perpendicular to direction of movement of the web,
   (c) a second support member mounted for rotation about an axis on the opposite side of the web from said first support member and parallel to the axis of the first support member formed of a pair of spaced members and a bridge portion connecting one side of each spaced members to define a recess therebetween,
   (d) a blade holder member mounted within the recess in the second support member for rotation about the axis of the said second support member and having stop means on the blade holder member acted upon by the said bridge portion for limiting rotation between the second support member and the blade holder member, a blade having a cutting edge with a convex curved portion at each end and a substantially straight intermediate portion, said cutting edge being mounted in a generally cylindrical location about the rotational axis of the second support member with the intermediate portion of the blade cutting edge disposed at an angle to the rotational axis,
   (e) presser means mounted on the second support member beside the convex blade cutting edge and biasing means for moving the presser means from a position between the cutting edge and the support member to a position on the other side of the cutting edge,
   (f) a second cutting blade mounted on the first support member having a concave cutting edge at each end with a substantially straight intermediate portion, disposed in a substantially cylindrical location about the rotational axis of the first support member and at an angle to the said rotational axis which varies slightly from said small angle of the cutting edge on the second support member, and
   (g) means for rotating said first and second support members.

2. The structure of claim 1, in which the presser means and the biasing means comprise a single piece of elastomeric material.

3. The structure of claim 1, in which the presser means and the biasing means comprise a single piece of elastomeric material and in which the elastomeric material has a durometer hardness of between 60 and 70.

4. The structure of claim 1, in which the presser means is located beside one curved cutting edge only.

5. The structure of claim 1, in which the presser means and the biasing means comprise a single sheet of springy material secured to the said ridge member and occupying in the unstressed condition a position spaced radially outward from the support member axis and mounted for flexure to a position spaced radially inwardly from the cutting edge.

6. The structure of claim 1, in which the presser means is a plate movably connected to the associated support means.

7. The structure of claim 1, in which the fixed blade has a straight intermediate blade portion and at least one separate blade member having a curved cutting edge and mounted to the associated support member in a fashion permitting adjustment between the intermediate blade portion and the curved blade portion.

8. A machine for cutting individual cards having rounded corners from a continuously moving web of sheet material comprising
   (a) a pair of parallel roller members,
   (b) means for continuously moving a web of sheet material between the rollers,
   (c) means mounting the roller members for rotation about axes parallel to the web plane and at an angle perpendicular to the web movement,
   (d) a first cutting blade mounted on one of said rollers and having a cutting edge extending across the width of the web with a concave portion at each end and a substantially helical intermediate portion located about the roller axis,
   (e) a second cutting blade mounted on the other roller member having convex portions mating with the first blade, and
   (f) means for rotating the rollers to thereby move the blades relative to each other to sever the continuously moving web along a curved line.

9. A machine for cutting individual portions having rounded corners from a continuously moving web of sheet material, comprising
   (a) a cutting blade for severing the web transversely and having curved cutting edges at each end of the straight edge for cutting rounded corners,
   (b) support means for holding the cutting blade on one side of a continuously moving web of material,
   (c) means mounted on one side of the web opposite the cutting blade for engagement with the blade during its cutting stroke,
   (d) means for moving said cutting blade relative to said blade engaging means on the opposite side of the web to sever the continuously moving web along a curved line, whereby the sheet material on one side of the line of severance is concavely curved and the sheet material on the other side of the line of severance is convexly curved, and
   (e) presser means mounted beside the curved portion of said blade on the support means holding said blade, and means for moving said presser means in a direction to separate a severed portion of the web from the cutting blade.

10. The structure of claim 9 in which the presser means and the means for moving the presser consists of an elastomeric material.

11. The structure of claim 10 in which the elastomeric material has a durometer hardness of 60–70.

12. The structure of claim 9 in which the presser means is of spring sheet material secured to the blade supporting means and mounted outwardly of the associated blade when in an unstressed condition.

13. The structure of claim 9 in which the presser means is a plate-like member.

14. A machine for cutting individual portions having rounded corners from a continuously moving web of sheet material, comprising
   (a) a first cutting blade having a concave portion,
   (b) a second cutting blade having a convex portion mating with the first blade,
   (c) support means for holding the first blade and the second blade on opposite sides of a continuously moving web of material,
   (d) means for moving said blades relative to each other to sever the continuously moving web along a curved line, whereby the sheet material on one side of the line of severance is concavely curved and the sheet material on the other side of the line of severance is convexly curved, (e) one of said cutting blades having a straight intermediate cutting portion and at least one separate curved cutting edge portion, and (f) means mounting the said curved cutting edge portion and the straight intermediate cutting edge portion for adjustment relative to each other.

References Cited

UNITED STATES PATENTS

| | | | |
|---|---|---|---|
| 868,856 | 10/1907 | Firm | 83—345 |
| 1,206,754 | 11/1916 | Duvall | 83—117 |
| 1,835,439 | 12/1931 | Stahly | 83—300 |
| 2,145,048 | 1/1939 | Hagen | 83—117 |
| 2,183,722 | 12/1939 | Newman | 83—342 X |
| 2,195,849 | 4/1940 | Carroll | 83—300 |
| 3,143,022 | 8/1964 | Anderson | 83—341 |
| 3,261,522 | 7/1966 | Aver | 83—300 X |

JAMES M. MEISTER, *Primary Examiner.*

U.S. Cl. X.R.

83—300, 342, 345, 348; 240—44; 340—97